("(12) United States Patent") 
Kawamura

(10) Patent No.: US 11,459,129 B2
(45) Date of Patent: Oct. 4, 2022

(54) POINTING MECHANISM

(71) Applicant: Mitsubishi Electric Corporation, Chiyoda-ku (JP)

(72) Inventor: Shunichi Kawamura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 378 days.

(21) Appl. No.: 16/332,288

(22) PCT Filed: Dec. 6, 2016

(86) PCT No.: PCT/JP2016/086241
§ 371 (c)(1),
(2) Date: Mar. 11, 2019

(87) PCT Pub. No.: WO2018/061226
PCT Pub. Date: Apr. 5, 2018

(65) Prior Publication Data
US 2019/0210744 A1    Jul. 11, 2019

(30) Foreign Application Priority Data

Sep. 29, 2016    (JP) .............................. JP2016-190606

(51) Int. Cl.
*B64G 1/40*    (2006.01)
*B64G 1/24*    (2006.01)
(Continued)

(52) U.S. Cl.
CPC .................. *B64G 1/24* (2013.01); *B64G 1/10* (2013.01); *B64G 1/222* (2013.01); *B64G 1/242* (2013.01); *B64G 1/409* (2013.01)

(58) Field of Classification Search
CPC .......... B64G 1/24; B64G 1/409; B64G 1/222; B64G 1/242; B64G 1/10; F02K 9/84
See application file for complete search history.

(56) References Cited

U.S. PATENT DOCUMENTS 5,349,532 A    9/1994 Tilley et al.
5,755,406 A *  5/1998 Aston .................. B64G 1/1007
                                              244/159.4
(Continued)

FOREIGN PATENT DOCUMENTS

EP    0 937 644 A2    8/1999
JP        6-24397 A    2/1994
(Continued)

OTHER PUBLICATIONS

International Search Report dated Mar. 7, 2017 in PCT/JP2016/086241 filed on Dec. 6, 2016.
(Continued)

*Primary Examiner* — Medhat Badawi
*Assistant Examiner* — Vicente Rodriguez
(74) *Attorney, Agent, or Firm* — Oblon, McClelland, Maier & Neustadt, L.L.P.

(57) ABSTRACT

An artificial satellite includes two pointing mechanisms. The pointing mechanisms respectively include main body side gimbals, deployed booms, thruster side gimbals, and thruster groups. The main body side gimbal connects the deployed boom to a satellite main body and adjusts a direction of the deployed boom. The thruster side gimbal connects the thruster to the deployed boom and adjusts the direction of the thruster. Each gimbal is a two-axis gimbal.

14 Claims, 8 Drawing Sheets

(51) Int. Cl.
*B64G 1/22* (2006.01)
*B64G 1/10* (2006.01)

(56) References Cited

U.S. PATENT DOCUMENTS

| | | | | |
|---|---|---|---|---|
| 6,032,904 | A * | 3/2000 | Hosick | B64G 1/26 244/169 |
| 6,565,043 | B1 | 5/2003 | Wittmann | |
| 9,387,942 | B2 | 7/2016 | Celerier | |
| 9,663,251 | B2 | 5/2017 | Munir | |
| 9,926,087 | B2 | 3/2018 | Doubrere | |
| 9,957,067 | B2 | 5/2018 | Celerier | |
| 10,046,867 | B2 | 8/2018 | Glogowski | |
| 10,183,765 | B2 * | 1/2019 | Bibighaus | B64G 1/26 |
| 10,232,959 | B2 | 3/2019 | Moro | |
| 10,464,694 | B1 | 11/2019 | Schwarz | |
| 10,569,909 | B2 | 2/2020 | Ho | |
| 10,875,669 | B2 | 12/2020 | Weiss | |
| 2012/0097797 | A1* | 4/2012 | Woo | B64G 1/26 244/158.6 |
| 2013/0292516 | A1* | 11/2013 | Celerier | B64G 1/26 244/158.6 |
| 2014/0361123 | A1 | 12/2014 | Celerier | |
| 2014/0361124 | A1 | 12/2014 | Celerier | |
| 2016/0114908 | A1 | 4/2016 | Knirsch et al. | |
| 2016/0016781 | A1 | 6/2016 | Janu et al. | |
| 2016/0176545 | A1 | 6/2016 | Munir et al. | |
| 2016/0207640 | A1 | 7/2016 | Kaltenbach | |
| 2016/0363937 | A1 | 12/2016 | Becker et al. | |
| 2016/0368624 | A1* | 12/2016 | Hruby | B64G 1/007 |
| 2017/0081048 | A1* | 3/2017 | Glogowski | B64G 1/40 |
| 2017/0129627 | A1* | 5/2017 | Moro | B64G 1/283 |
| 2017/0283094 | A1* | 10/2017 | Ho | B64G 1/26 |
| 2017/0349302 | A1 | 12/2017 | Bibighaus | |
| 2018/0029727 | A1 | 2/2018 | Doubrere | |
| 2019/0049999 | A1 | 2/2019 | Weiss | |
| 2019/0210744 | A1 | 7/2019 | Kawamura | |

FOREIGN PATENT DOCUMENTS

| | | |
|---|---|---|
| JP | 9-317560 A | 12/1997 |
| JP | 10-278898 A | 10/1998 |
| JP | 11-291998 A | 10/1999 |
| JP | 2016-84817 A | 5/2016 |
| JP | 2017-1666 A | 1/2017 |
| WO | WO 2015/138592 A2 | 9/2015 |
| WO | WO 2016/128389 A1 | 8/2016 |

OTHER PUBLICATIONS

International Search Report dated Dec. 27, 2016 in PCT/JP2016/078767 filed on Sep. 29, 2016.
U.S. Appl. No. 16/332,236, filed Mar. 11, 2019, Hisayoshi Izumisawa.
U.S. Appl. No. 16/332,288, filed Mar. 11, 2019, Shunichi Kawamura.
Extended European Search Report dated July 1, 2019 in Patent Application No. 16917690.6, 8 pages.
Japanese Office Action dated Aug. 6, 2019 in Japanese Patent Application No. 2018-541800 (with English translation), 6 pages.
Extended European Search Report dated Apr. 1, 2020 in Patent Application No. 16917775.5, 7 pages.
U.S. Office Action issued in U.S. Appl. No. 16/332,236 dated Jul. 26, 2021.
U.S. Advisory Action issued in U.S. Appl. No. 16/332,236 dated Jan. 7, 2022.
U.S. Office Action issued in U.S. Appl. No. 16/332,236 dated Oct. 22, 2021.
Office Action issued in U.S. Appl. No. 16/332,236 dated Mar. 4, 2022.
U.S. Office Action issued in U.S. Appl. No. 16/332,236 dated May 26, 2022.
Advisory Action issued in U.S. Appl. No. 16/332,236 dated Aug. 5, 2022.

* cited by examiner

POINTING MECHANISM

TECHNICAL FIELD

The present invention relates to a mechanism for mounting an electric propulsion thruster on an artificial satellite.

BACKGROUND ART

In recent years, a propulsion system mounted on the artificial satellite for posture control is shifting from a conventional chemical propulsion system to an electric propulsion system.

The electric propulsion system has the following advantages and disadvantages as compared with the chemical propulsion system.

The advantages of the electric propulsion system are as follows.
(1) Specific impulse is high. A so-called fuel economy is good. Therefore, it is possible to reduce an amount of propellant to be mounted on the artificial satellite. That is, if a propulsion weight is the same, a life of the electric propulsion system is longer than that of the chemical propulsion system.
(2) Safety is high because the propellant is not flammable.
(3) It is possible to perform orbit raising and station keeping using the same thruster.
(4) The electric propulsion system can be mounted on a deployment mechanism. That is, the thruster can be placed at a position away from the artificial satellite.

The disadvantages of the electric propulsion system are as follows.
(1) The electric propulsion thruster has a main body which is large in size and heavy in mass.
(2) A dedicated power supply is necessary because power consumption is large.
(3) A spreading angle of a firing plume is large.
(4) When the firing plume strikes a mounted equipment, the mounted equipment deteriorates.
(5) Cost is high.
(6) It takes time for orbit raising because thrust is weak.

In order to compensate for the above disadvantage (6), the electric propulsion system may be used in combination with the chemical propulsion system in the orbit raising.

Further, in order to compensate for the above disadvantages (1) to (5), it is the most important task to reduce the number of electric propulsion thrusters mounted.

Therefore, it is necessary to enable each electric propulsion thruster to fire in multiple directions.

A technique disclosed in Patent Literature 1 is intended to improve redundancy of the electric propulsion system used for orbit control of the artificial satellite.

Specifically, the electric propulsion thruster is attached to the artificial satellite using a deployed boom with a gimbal mechanism and a pivot mechanism mounted at both ends. This increases a degree of freedom of a firing direction of the electric propulsion thruster, so that it is possible to perform north-south control with one electric propulsion thruster.

In addition, when another electric propulsion thruster is disposed, even if the electric propulsion thruster fails, it is possible to substitute the electric propulsion thruster mounted on the deployed boom. As a result, it is possible to reduce the number of electric propulsion thrusters mounted on the artificial satellite while maintaining redundancy and reliability.

However, the technique disclosed in Patent Literature 1 has the following problems.

(1) It is not clear how to perform east-west control other than north-south control. That is, it is not clear whether east-west control can be performed.
(2) In order to perform north-south control by one electric propulsion thruster, the electric propulsion thruster is mounted on an anti-earth-oriented surface. However, when the electric propulsion thruster is mounted on the anti-earth-oriented surface in the artificial satellite in which the chemical propulsion system and the electric propulsion system are used together, the electric propulsion thruster competes with a chemical propulsion engine. Therefore, it is considered that the technique disclosed in Patent Literature 1 cannot be applied to the artificial satellite in which the chemical propulsion system and the electric propulsion system are used together.
(3) Details of a degree of freedom about the pivot mechanism is not clear. Therefore, a movable region of the electric propulsion thruster and a firing region of the firing plume are not clear.
(4) It is not clear in which state the deployed boom is accommodated when launching a rocket carrying the artificial satellite. That is, it is not clear how to accommodate the deployed boom in a rocket fairing.
(5) It is not clear whether it can deal with a case of firing an odd number of electric propulsion thrusters in the orbit raising and the like. That is, it is not clear whether it is possible to allow the odd number of electric propulsion thrusters to fire so that no moment is generated about a center of gravity of the artificial satellite.

CITATION LIST

Patent Literature

Patent Literature 1: U.S. Pat. No. 6,565,043

SUMMARY OF INVENTION

Technical Problem

An object of the present invention is to enable north, south, east and west control of the artificial satellite.

Solution to Problem

A pointing mechanism according to the present invention includes:
a deployed boom having a rod shape;
a main body side gimbal to connect the deployed boom to a satellite main body and adjust a direction of the deployed boom; and
a thruster side gimbal to connect a thruster to the deployed boom and adjust a direction of the thruster, wherein
the pointing mechanism is mounted in a pair on an artificial satellite.

Advantageous Effects of Invention

According to the present invention, since each of the two pointing mechanisms includes the gimbal to adjust the direction of the deployed boom and the gimbal to adjust the direction of the thruster, it is possible to perform north, south, east and west control of the artificial satellite.

DESCRIPTION OF EMBODIMENTS

Figure 1:
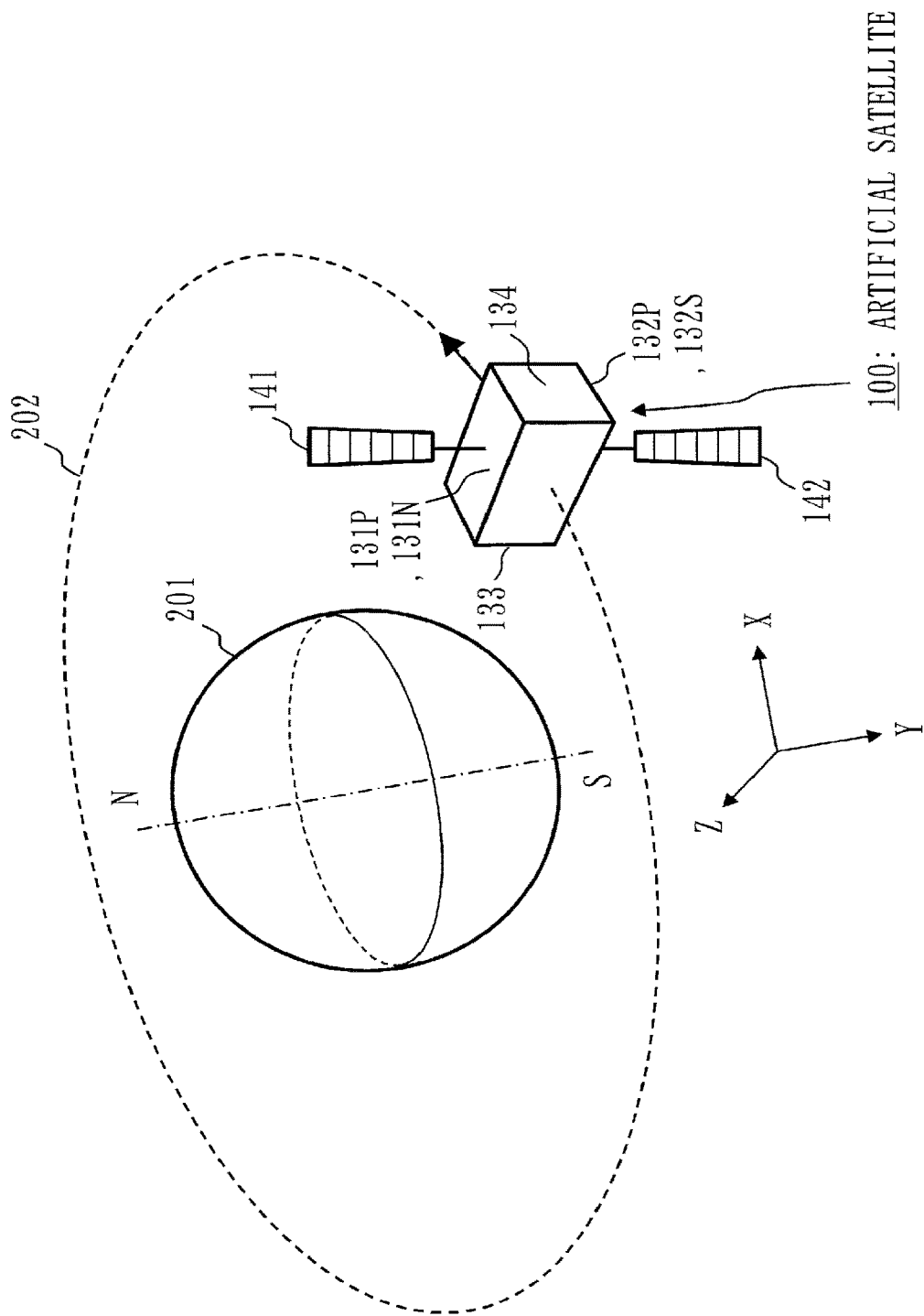
FIG. 1 is a schematic view of an artificial satellite 100 in Embodiment 1.

In Embodiments and the drawings, the same elements or corresponding elements are denoted by the same reference numerals. Description of the elements denoted by the same reference numerals will be omitted or simplified appropriately.

Embodiment 1

An artificial satellite including two pointing mechanisms will be described with reference to FIGS. 1 to 8.

Unless otherwise specified, a thruster means an electric propulsion thruster.

Description of Structure

An outline of an artificial satellite 100 will be described with reference to FIG. 1.

The artificial satellite 100 is an artificial satellite orbiting the earth 201.

The orbit around which the artificial satellite 100 orbits is referred to as a satellite orbit 202. Specifically, a satellite orbit 202 is a geostationary orbit.

A surface facing the earth 201 in the geostationary orbit of the artificial satellite 100 is referred to as an earth-oriented surface 133 and a surface facing away from the earth 201 in the geostationary orbit of the artificial satellite 100 is referred to as an anti-earth-oriented surface 134.

A surface on which a first solar cell paddle 141 is provided is referred to as a first paddle surface 131P and a surface on which a second solar cell paddle 142 is provided is referred to as a second paddle surface 132P.

The first paddle surface 131P is a north surface 131N facing the north side when the artificial satellite 100 orbits the earth 201.

The second paddle surface 132P is a south surface 132S facing the south side when the artificial satellite 100 orbits the earth 201.

A traveling direction (east-west direction) of the artificial satellite 100 during station keeping in the geostationary orbit is indicated by an X-axis, the north-south direction is indicated by a Y-axis, and a direction in which the earth 201 is located as seen from the artificial satellite 100 in the geostationary orbit is indicated by a Z-axis. It should be noted that the Z-axis is the traveling direction of the artificial satellite 100 during orbit raising.

A structure of the artificial satellite 100 will be described with reference to FIGS. 2 and 3.

Figure 2:
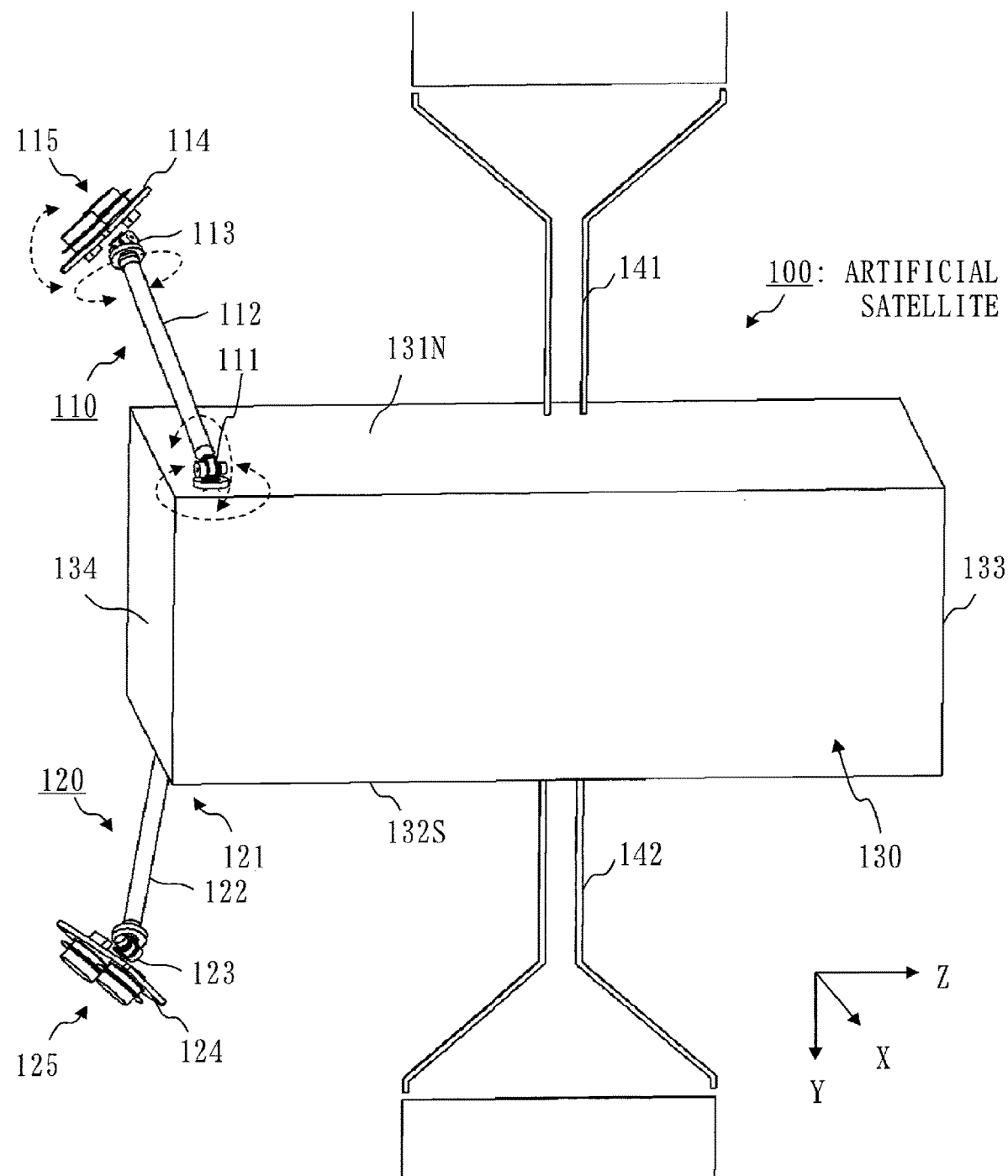
FIG. 2 is a structural view of the artificial satellite 100 in Embodiment 1.
Figure 3:
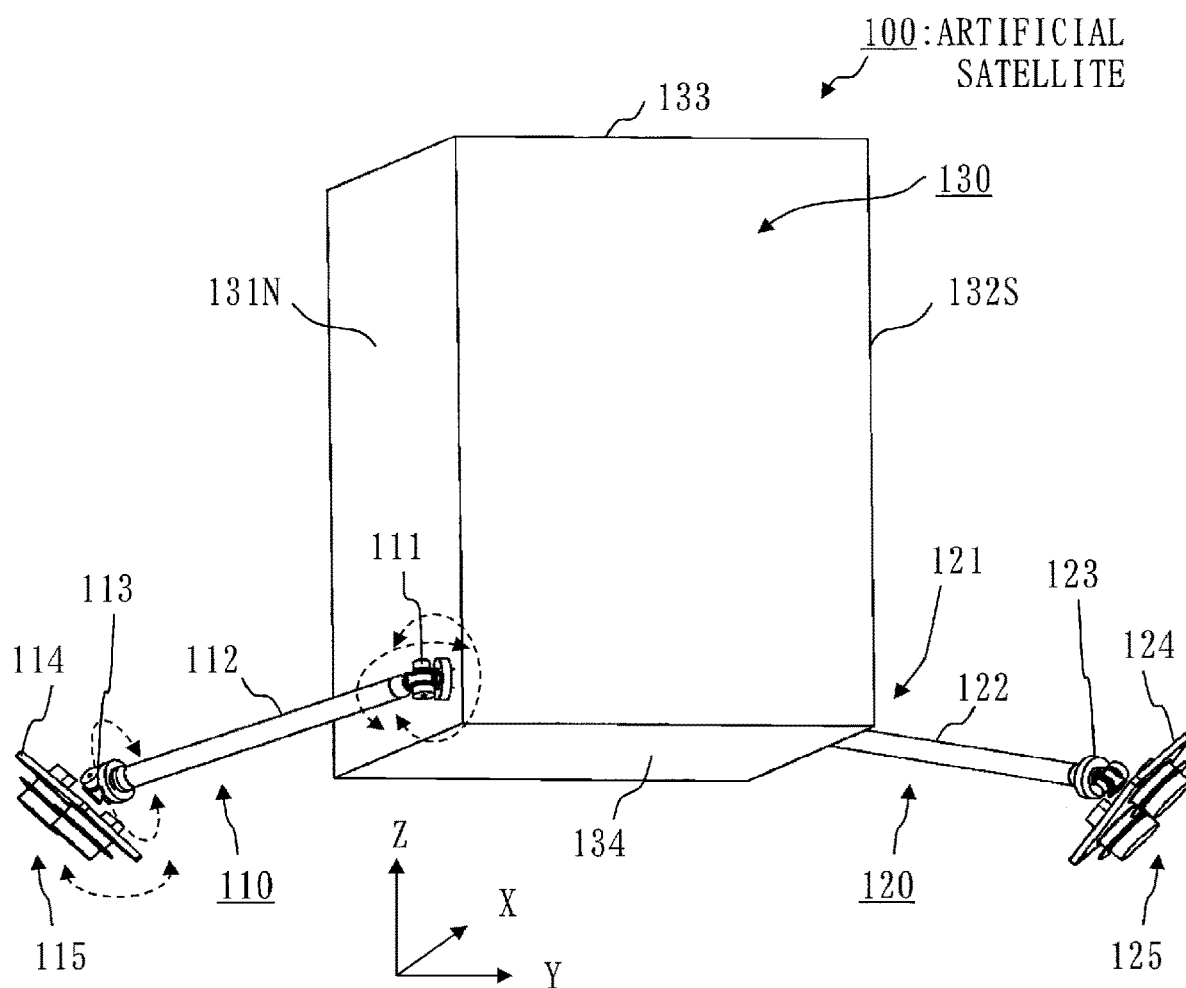
FIG. 3 is a structural view of the artificial satellite 100 in Embodiment 1.

As illustrated in FIG. 2, the artificial satellite 100 includes the first solar cell paddle 141 and the second solar cell paddle 142, however, illustration of the first solar cell paddle 141 and the second solar cell paddle 142 is omitted in FIG. 3.

The artificial satellite 100 includes a satellite main body 130, two pointing mechanisms (110, 120), and two thruster groups (115, 125).

The satellite main body 130 has the north surface 131N, the south surface 132S, the earth-oriented surface 133, and the anti-earth-oriented surface 134. The satellite main body 130 is a main body of the artificial satellite 100. That is, the satellite main body 130 is a structure body of the artificial satellite 100.

A first pointing mechanism 110 is a pointing mechanism provided on the north surface 131N.

The pointing mechanism is one on which the thruster group is mounted and adjusting an arrangement of the thruster group.

The first pointing mechanism 110 is mounted with a first thruster group 115 and adjusts the arrangement of the first thruster group 115.

The first pointing mechanism 110 includes a first main body side gimbal 111, a first deployed boom 112, a first thruster side gimbal 113, and a first thruster base 114.

The first main body side gimbal 111 is a gimbal to connect the first deployed boom 112 to the satellite main body 130 and change a direction of the first deployed boom 112. Specifically, the first main body side gimbal 111 is a two-axis gimbal. In the two-axis gimbal, a rotating body is supported via bearings so as to be rotatable about respective rotation axes of orthogonal two-axis and oblique two-axis. The bearing is composed of, for example, a rolling bearing, a sliding bearing or the like which can rotate about one axis. Note that dotted line directions in FIG. 3 indicate directions of rotation.

The first deployed boom 112 is a boom having a rod shape.

The first thruster side gimbal 113 is a gimbal to connect the first thruster base 114 to the first deployed boom 112 and change a direction of the first thruster base 114. Specifically, the first thruster side gimbal 113 is the two-axis gimbal. In the two-axis gimbal, the rotating body is supported via the bearings so as to be rotatable about the respective rotation axes of the orthogonal two-axis and the oblique two-axis. The bearing is composed of, for example, the rolling bearing, the sliding bearing or the like which can rotate about one axis. Note that dotted arrows in FIG. 3 indicate directions of rotation.

The first thruster base 114 is a base on which the first thruster group 115 is mounted. A direction of firing of the first thruster group 115 is determined by the direction of the first thruster base 114.

The first thruster group 115 is composed of a plurality of thrusters. In Embodiment 1, the first thruster group 115 is composed of two thrusters.

A second pointing mechanism 120 is a pointing mechanism provided on the south surface 132S.

The second pointing mechanism 120 is mounted with a second thruster group 125 and adjusts the arrangement of the second thruster group 125.

The second pointing mechanism 120 includes a second main body side gimbal 121, a second deployed boom 122, a second thruster side gimbal 123, and a second thruster base 124.

The second main body side gimbal 121 is a gimbal to connect the second deployed boom 122 to the satellite main body 130 and change a direction of the second deployed boom 122. Specifically, the second main body side gimbal 121 is a two-axis gimbal.

The second deployed boom 122 is a boom having a rod shape.

The second thruster side gimbal 123 is a gimbal to connect the second thruster base 124 to the second deployed boom 122 and change a direction of the second thruster base 124. Specifically, the second thruster side gimbal 123 is the two-axis gimbal.

The second thruster base 124 is a base on which the second thruster group 125 is mounted. A direction of firing of the second thruster group 125 is determined by the direction of the second thruster base 124.

The second thruster group 125 is composed of a plurality of thrusters. In Embodiment 1, the second thruster group 125 is composed of two thrusters.

A first attachment portion to which the first main body side gimbal 111 is attached and a second attachment portion to which the second main body side gimbal 121 is attached have the following positional relationship.

The first attachment portion is in a position symmetrical to the second attachment portion.

The first attachment portion is located on the north surface 131N and the second attachment portion is located on the south surface 132S.

The first attachment portion is located at an end on the anti-earth-oriented surface side of the north surface 131N and the second attachment portion is located at an end on the anti-earth-oriented surface side of the south surface 132S.

The first attachment portion is located at one corner out of corners on the anti-earth-oriented surface side and the second attachment portion is located at a diagonal corner of the first attachment portion out of the corners on the anti-earth-oriented surface side.

That is, the first attachment portion and the second attachment portion are in rotationally symmetric positions about a satellite center of gravity 101 as seen from the earth-oriented surface side.

Description of Operation

The first pointing mechanism 110 and the second pointing mechanism 120 when the artificial satellite 100 is accommodated in a rocket fairing will be described with reference to FIGS. 4 and 5.

Figure 4:
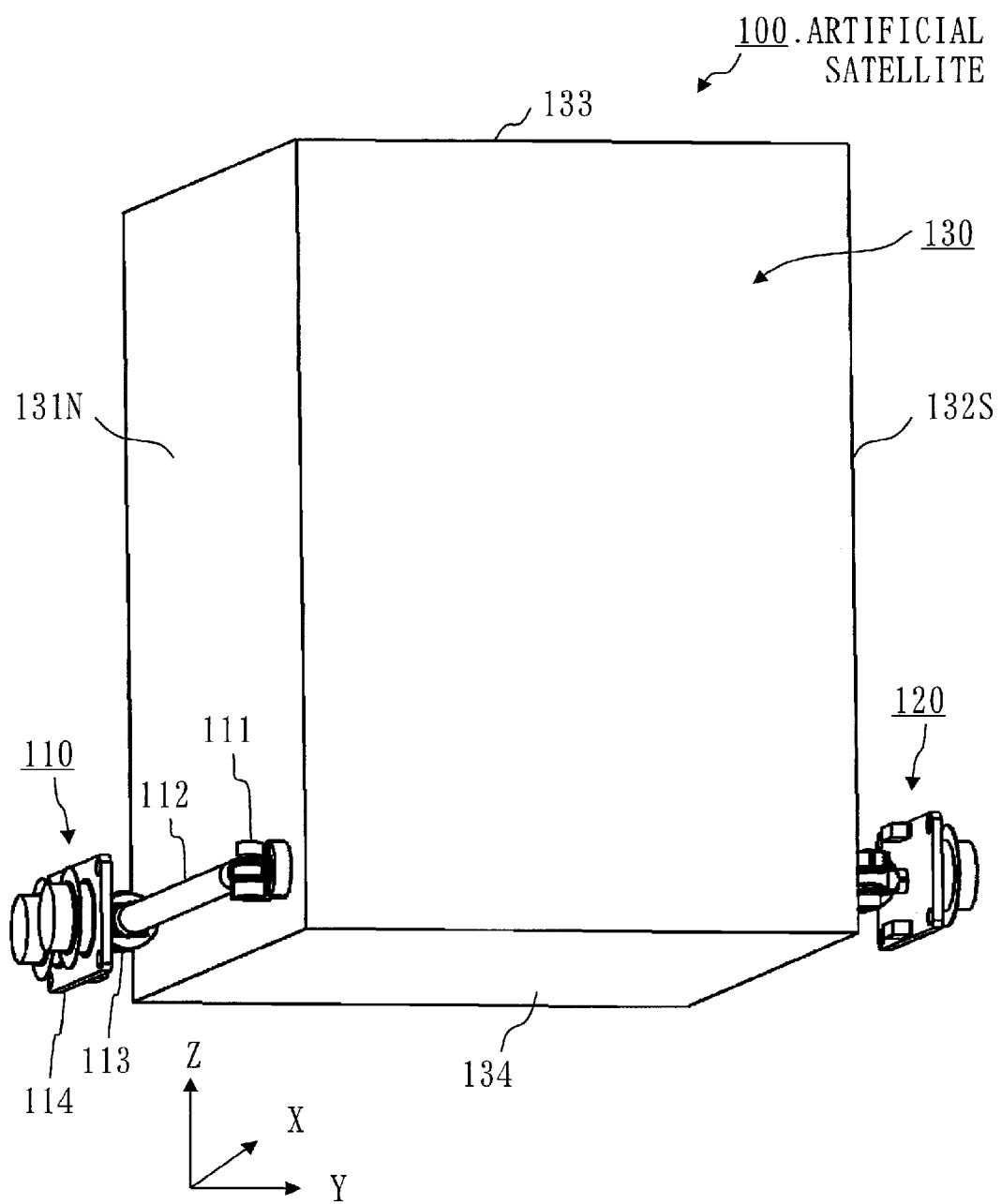
FIG. 4 is a perspective view illustrating the artificial satellite 100 during accommodation in Embodiment 1.
Figure 5:
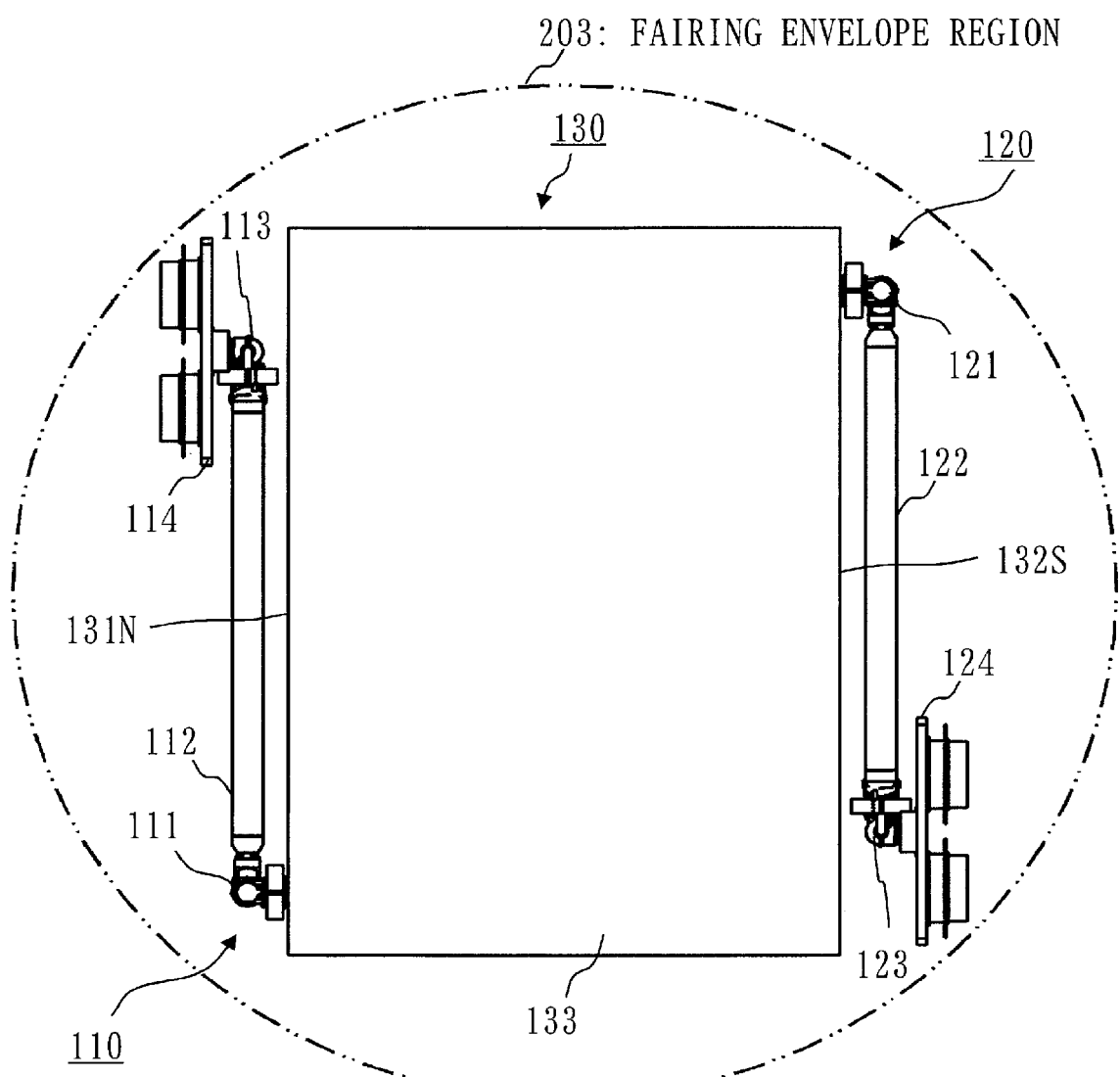
FIG. 5 is a top view illustrating the artificial satellite 100 during accommodation in Embodiment 1.

FIG. 4 is a perspective view, and FIG. 5 is a top view.

The rocket fairing is a fairing for a rocket which brings the satellite 100 to space.

In the first pointing mechanism 110, the direction of the first deployed boom 112 is adjusted to be parallel to the north surface 131N by the first main body side gimbal 111. Further, the direction of the first thruster base 114 is adjusted by the first thruster side gimbal 113 such that a bottom surface of the first thruster base 114 is parallel to the north surface 131N.

In the second pointing mechanism 120, the direction of the second deployed boom 122 is adjusted to be in parallel with the south surface 132S by the second main body side gimbal 121. Further, the direction of the second thruster base 124 is adjusted by the second thruster side gimbal 123 such that a bottom surface of the second thruster base 124 is parallel to the south surface 132S.

As a result, the first pointing mechanism 110 and the second pointing mechanism 120 are accommodated in a fairing envelope region 203. The fairing envelope region 203 is a region in which the artificial satellite 100 is accommodated in the rocket fairing.

The deployed booms (112, 122) have the longest length in a length tolerance range.

The length tolerance range is a range to be satisfied by a length of the deployed boom to accommodate the entire pointing mechanisms (110, 120) in the fairing envelope region 203 in a state in which the direction of the deployed boom is adjusted as illustrated in FIG. 5.

In FIG. 5, a length from the first main body side gimbal 111 to an end of the first thruster base 114 is substantially equal to a width of the north surface 131N. Similarly, a length from the second main body side gimbal 121 to an end of the second thruster base 124 is substantially equal to a width of the south surface 132S.

As illustrated in FIGS. 4 and 5, the pointing mechanisms (110, 120) can be made parallel to the satellite main body 130. This makes it possible to bring the thruster, which is a heavy object, closer to the satellite main body 130. Therefore, rigidity design during accommodation is easy. That is, it is possible to reduce weight while increasing a natural frequency (an eigenvalue) during accommodation of the pointing mechanisms (110, 120).

An operation of the first pointing mechanism 110 and the second pointing mechanism 120 in an XY plane will be described with reference to FIG. 6.

A mark written at a center of the earth-oriented surface 133 indicates the satellite center of gravity 101 in the XY plane. The satellite center of gravity 101 is a center of gravity of the artificial satellite 100.

The XY plane corresponds to a plane along north, south, east and west.

In the first pointing mechanism 110, the direction of the first deployed boom 112 can be adjusted by the first main body side gimbal 111, and the direction of the first thruster base 114 can be adjusted by the first thruster side gimbal 113.

Therefore, it is possible to adjust an angle α to either plus or minus. The angle α is an angle formed by a YZ plane indicated by a one-dot chain line and a firing vector indicated by a white arrow. A direction of the firing vector indicates a firing direction of the thruster group.

Therefore, it is possible to control the traveling direction of the artificial satellite 100 in any direction of north, south, east and west. That is, it is possible to perform north, south, east and west control.

Further, an angle θ formed by the first deployed boom 112 and the north surface 131N can be reduced to 90 degrees or less. That is, a driving amount of the first main body side gimbal 111 can be reduced to 90 degrees or less in any of two axial directions in which the first main body side gimbal 111 rotates. Furthermore, the driving amount of the first thruster side gimbal 113 can be reduced to 90 degrees or less in any of two axial directions in which the first thruster side gimbal 113 rotates.

Therefore, it is possible to simplify mounting of electric wiring and propellant piping passing through a movable portion of each gimbal (111, 113).

It should be noted that the direction of the firing vector needs to coincide with the satellite center of gravity 101. That is, it is required for the satellite center of gravity 101 to be located on an extended line of the firing vector.

Figure 6:
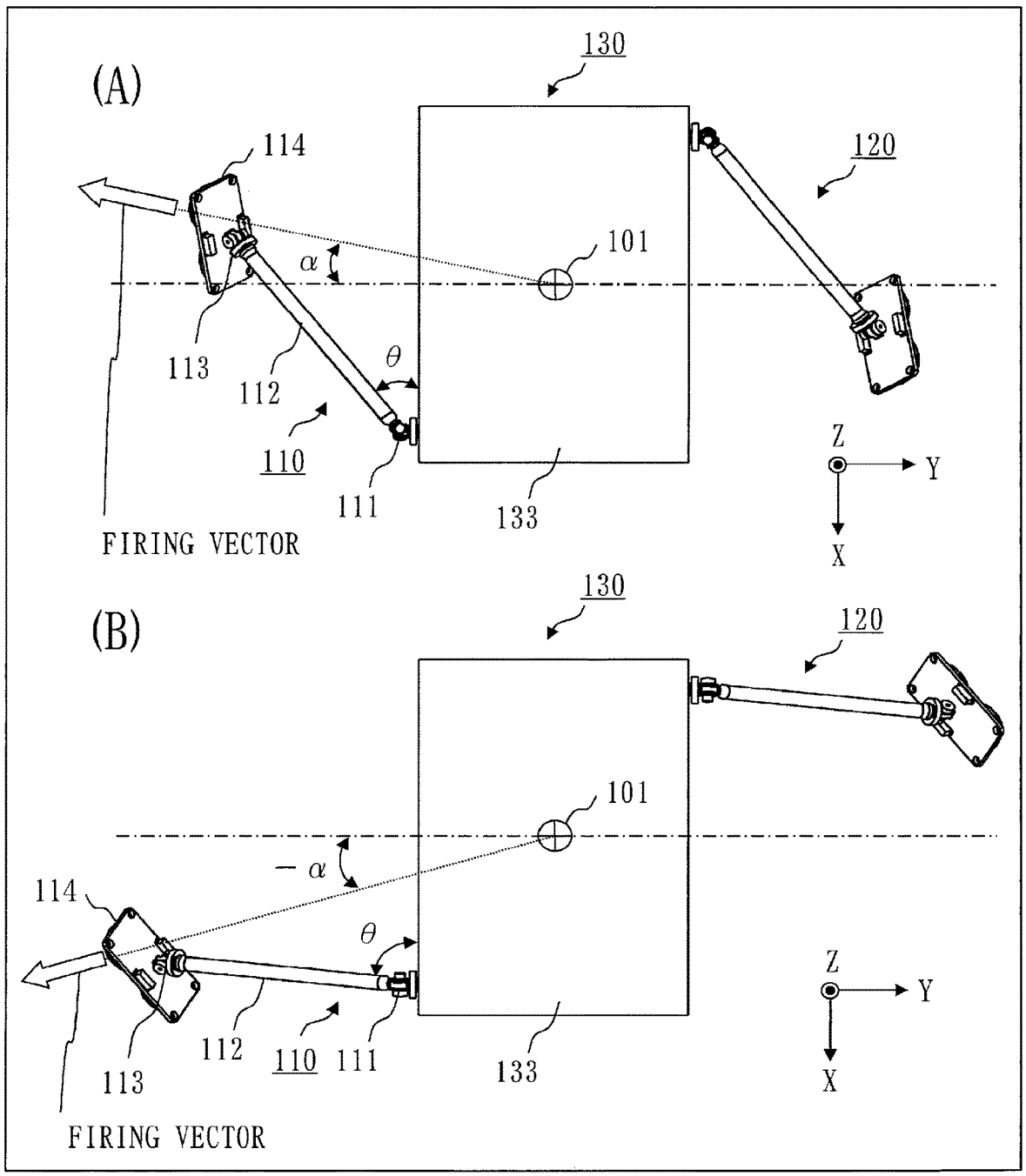
FIG. 6 is a view illustrating an operation of a pointing mechanism in Embodiment 1.

The above description based on FIG. 6 also applies to the second pointing mechanism 120.

Figure 7:
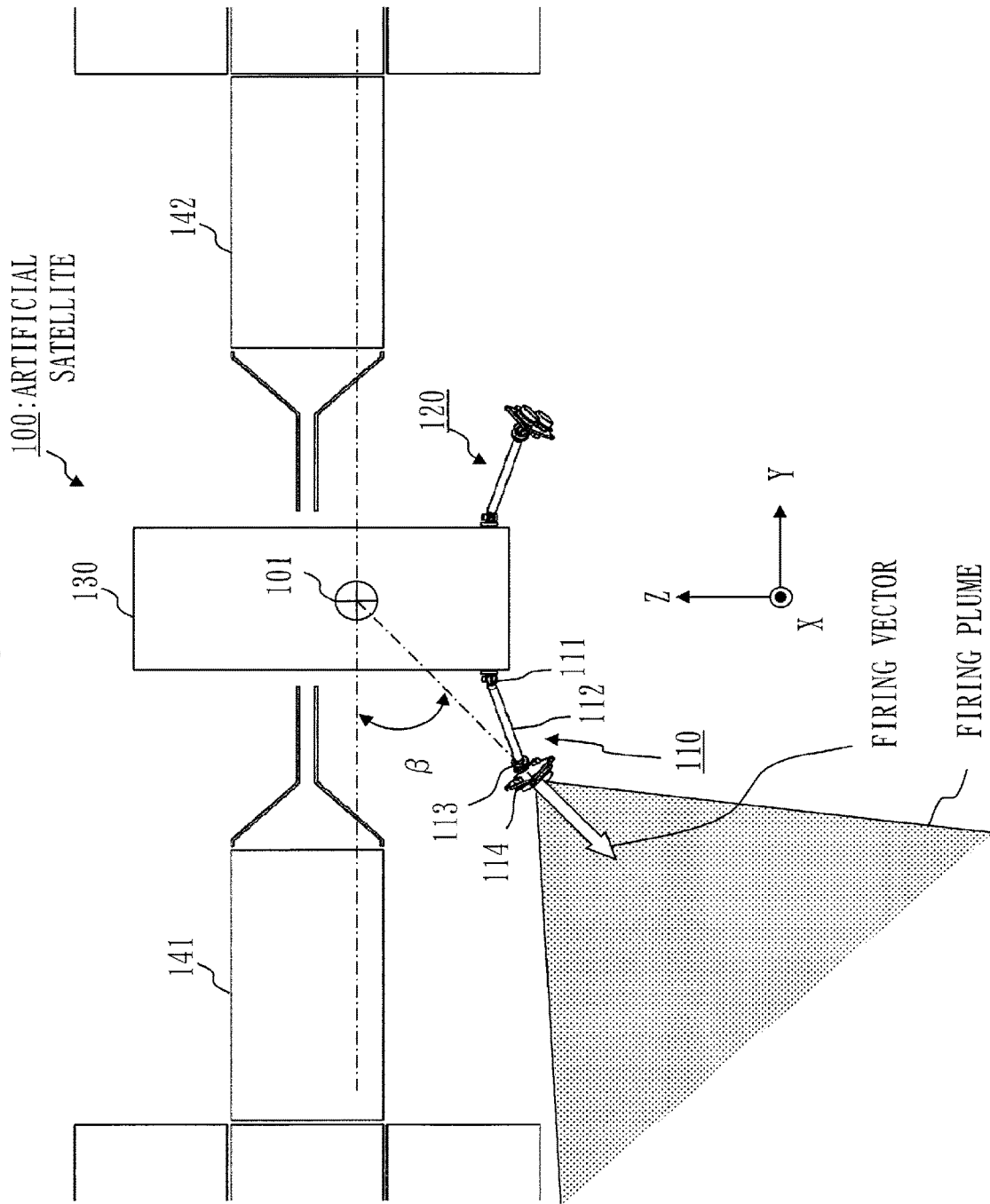
FIG. 7 is a view illustrating the artificial satellite 100 during station keeping in Embodiment 1.

The first pointing mechanism 110 and the second pointing mechanism 120 during station keeping will be described with reference to FIG. 7.

A shaded portion indicates a thruster firing range, that is, a range of a firing plume fired from the thruster.

In the first pointing mechanism 110, the direction of the first deployed boom 112 is adjusted by the first main body side gimbal 111, and the direction of the first thruster base 114 is adjusted by the first thruster side gimbal 113. The second pointing mechanism 120 is similarly adjusted.

Thus, it is possible to make an angle β to be the minimum angle in an angle tolerance range.

The angle β is a firing direction angle formed by the XY plane indicated by a one-dot chain line and the firing vector indicated by a white arrow.

The angle tolerance range is a range to be satisfied by the angle so that the first solar cell paddle 141 does not enter the range of the firing plume.

That is, it is possible to bring the firing vector close to the Y-axis direction while avoiding the firing plume from hitting the solar cell paddle. As a result, a firing efficiency is improved.

Further, rotation angles of the first main body side gimbal 111 and the first thruster side gimbal 113 of the first pointing mechanism 110 and the second main body side gimbal 121 and the second thruster side gimbal 123 of the second pointing mechanism 120 are adjusted. Thus, the direction of the firing vector coincides with or deviates from the satellite center of gravity 101. Therefore, it is possible to generate a moment about the center of gravity of the artificial satellite 100 and perform unloading.

Figure 8:
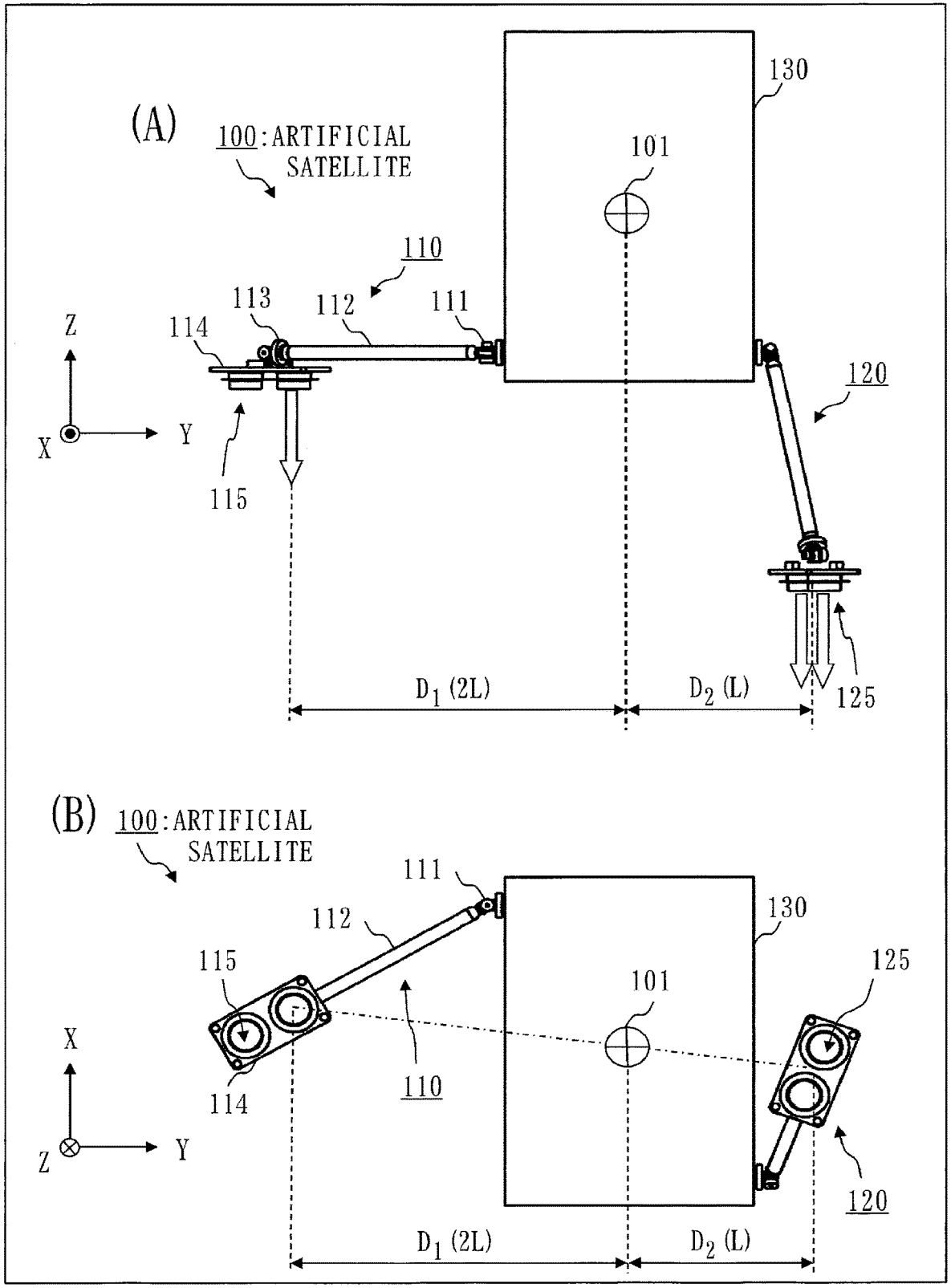
FIG. 8 is a view illustrating the artificial satellite 100 during orbit raising in Embodiment 1.

The first pointing mechanism 110 and the second pointing mechanism 120 during orbit raising will be described with reference to FIG. 8.

The number of activated thrusters in the first thruster group 115 is referred to as a first operation number. Further, the number of activated thrusters in the second thruster group 125 is referred to as a second operation number. Note that the activated thrusters mean the thrusters for firing.

A first distance $D_1$ and the second distance $D_2$ are distances in the XY plane having the traveling direction (+Z) as a normal line during orbit raising.

When the first operation number and the second operation number are different from each other, the first thruster group 115 and the second thruster group 125 are arranged so that a ratio of the first distance $D_1$ to the second distance $D_2$ is an inverse ratio of the first operation number to the second operation number.

The first distance $D_1$ is a linear distance between the satellite center of gravity 101 and the first thruster group 115 when the satellite center of gravity 101 and the first thruster group 115 are projected on the XY plane having the traveling direction (+Z) as the normal line during orbit raising. Specifically, the first distance $D_1$ is the linear distance from the satellite center of gravity 101 to a center of the activated thruster in the first thruster group 115 in the above-described XY plane.

The second distance $D_2$ is a linear distance between the satellite center of gravity 101 and the second thruster group 125 when the satellite center of gravity 101 and the second thruster group 125 are projected on the above-described XY plane. Specifically, the second distance $D_2$ is the linear distance from the satellite center of gravity 101 to a center of the activated thruster in the second thruster group 125 in the above-described XY plane.

When the first operation number is one and the second operation number is two, a ratio of the first operation number to the second operation number is 1:2.

In this case, the ratio of the first distance $D_1$ to the second distance $D_2$ is 2:1. That is, when the second distance $D_2$ is L, the first distance $D_1$ is 2L.

At this time, at least one of the first pointing mechanism 110 and the second pointing mechanism 120 is adjusted.

When the first pointing mechanism 110 is adjusted, the direction of the first deployed boom 112 is adjusted by the first main body side gimbal 111, and the direction of the first thruster base 114 is adjusted by the first thruster side gimbal 113.

When the ratio of the first distance $D_1$ to the second distance $D_2$ is the inverse ratio of the first operation number to the second operation number, and the satellite center of gravity 101, the first thruster group 115 and the second thruster group 125 projected on the above-described XY plane are present in a straight line, no moment about the center of gravity of the artificial satellite 100 is generated.

This enables the orbit raising.

For example, even when an odd number of (three) thrusters are fired, since no moment is generated about the center of gravity of the artificial satellite 100, the orbit raising can be performed.

It is not necessary to match the direction of the firing vector with the satellite center of gravity 101 during orbit raising.

Effect of Embodiment 1

In Embodiment 1, two pointing mechanisms (the first pointing mechanism 110 and the second pointing mechanism 120) are mounted on the artificial satellite. Each pointing mechanism is structured by arranging a first two-axis gimbal, a deployed boom and a second two-axis gimbal in order from the satellite main body side, and connects the thruster to the satellite main body.

Each two-axis gimbal has a degree of freedom of an azimuth-elevation system. The first two-axis gimbal rotates in an azimuth direction on the satellite main body side and rotates in an elevation direction on the deployed boom side. The second two-axis gimbal rotates in the azimuth direction on the deployed boom side and rotates in the elevation direction on the thruster side.

Each two-axis gimbal can also be composed of a universal joint having degrees of freedom in X and Y directions.

Since the two pointing mechanisms (the first pointing mechanism 110 and the second pointing mechanism 120) with the deployed boom using the two-axis gimbal are mounted on the artificial satellite, the following effects can be obtained.

As described with reference to FIGS. 4 and 5, degrees of freedom of postures of the pointing mechanisms (the first pointing mechanism 110 and the second pointing mechanism 120) increase during accommodation.

As described with reference to FIG. 6, the north, south, east and west control is possible.

As described with reference to FIG. 7, the degrees of freedom of the postures of the pointing mechanisms (the first pointing mechanism 110 and the second pointing mechanism 120) increase during deployment.

As described with reference to FIG. 8, it is possible to perform orbit raising by firing the odd number of thrusters.

Embodiment 1 has the following effects including the above effects.

In order to perform the north, south, east and west control in posture control on the geostationary orbit, four or four groups of electric propulsion thrusters have been required in the case of using a conventional pointing mechanism with a narrow driving range.

In Embodiment 1, it is possible to realize the north, south, east and west control by two or two groups of electric propulsion thrusters.

In the north, south, east and west control of the artificial satellite, it is necessary to direct the electric propulsion thruster mainly in the north-south direction to perform firing.

In Embodiment 1, since the pointing mechanisms (the first pointing mechanism 110 and the second pointing mechanism 120) are provided on the south surface and the north surface, an operation driving amount of the two-axis gimbal can be minimized.

In the north, south, east and west control of the artificial satellite, as the length of the deployed boom is long, the firing efficiency of the electric propulsion thruster is improved. Therefore, it is necessary to increase the length of the deployed boom within an allowable range of the fairing envelope region. When both of the two deployed booms are set to the maximum length, the two deployed booms necessarily have the same length.

On the other hand, it is necessary to prevent generation of moment about the center of gravity of the artificial satellite in order to simultaneously fire the odd number of (for example, three) electric propulsion thrusters. Specifically, the ratio of the distances between the electric propulsion thrusters and the satellite center of gravity must be the inverse ratio of the operation numbers of electric propulsion thrusters. For that purpose, it has been necessary to change the length of each deployed boom, for example, by making each deployed boom a telescopic structure and expanding or contracting each deployed boom, or by providing a joint at a center of each deployed boom and bending each deployed boom.

However, when the two-axis gimbal has an appropriate degree of freedom, even if the length of the deployed boom is the same, it is possible to take a posture satisfying the above condition. Therefore, the firing efficiency is not reduced by using the short deployed boom, and resources such as a motor for operating the telescopic structure or the joint are unnecessary.

By using the deployed boom, the electric propulsion thruster can be placed at a position away from the satellite main body. Then, it is possible to bring the firing vector closer to a desired direction while avoiding the firing plume from hitting a satellite equipment such as a solar cell. As a result, the firing efficiency is improved, so that saving of propellant can be further expected.

Further, it is possible to perform orbit raising even if a specific odd number of (for example, three) electric propulsion thrusters are simultaneously fired in the thruster groups (115, 125).

Therefore, electric power required for propulsion is small as compared with a case where an even number of (for example, four) electric propulsion thrusters more than a specific odd number are simultaneously fired, and a larger thrust force can be obtained as compared with a case where an even number of (for example, two) electric propulsion thrusters less than the specific odd number are simultaneously fired. Therefore, more flexible propulsion control is possible.

In addition, for example, even when one of the four electric propulsion thrusters fails, the orbit raising can be performed by propulsion operation of the remaining three electric propulsion thrusters. Therefore, it is also possible to construct a more flexible redundant system.

Other Structure

The two pointing mechanisms (the first pointing mechanism 110 and the second pointing mechanism 120) may be arranged mirror-symmetrically.

More specifically, in FIG. 3, the second main body side gimbal 121 of the second pointing mechanism 120 may be provided at a corner on the near side like the first main body side gimbal 111 of the first pointing mechanism 110. Further, both the first main body side gimbal 111 of the first pointing mechanism 110 and the second main body side gimbal 121 of the second pointing mechanism 120 may be arranged not at the far side or the near side corner but between the far side corner and the near side corner.

The number of thrusters constituting each thruster group may be three or more.

Supplement to Embodiments

Embodiments are examples of preferred modes and are not intended to limit the technical scope of the present invention. Embodiments may be implemented partially or in combination with other modes.

REFERENCE SIGNS LIST

100: artificial satellite, 101: satellite center of gravity, 110: first pointing mechanism, 111: first main body side gimbal, 112: first deployed boom, 113: first thruster side gimbal, 114: first thruster base, 115: first thruster group, 120: second pointing mechanism, 121: second main body side gimbal, 122: second deployed boom, 123: second thruster side gimbal, 124: second thruster base, 125: second thruster group, 130: satellite main body, 131N: north surface, 131P: first paddle surface, 132P: second paddle surface, 132S: south surface, 133: earth-oriented surface, 134: anti-earth-oriented surface, 141: first solar cell paddle, 142: second solar cell paddle, 201: earth, 202: satellite orbit, 203: fairing envelope region.

The invention claimed is:

1. A pointing mechanism comprising:
a deployed boom having a rod shape;
a main body side gimbal to connect the deployed boom to a satellite main body and adjust a direction of the deployed boom; and
a thruster side gimbal to connect a thruster to the deployed boom and adjust a direction of the thruster, wherein
the pointing mechanism includes a first pointing mechanism and a second pointing mechanism each mounted on an artificial satellite,
each of the main body side gimbal and the thruster side gimbal is a two-axis gimbal,
the first pointing mechanism includes a first attachment portion located at one corner out of four corners on a first anti-earth-oriented surface side, and
the second pointing mechanism includes a second attachment portion located at a diagonal corner of the first attachment portion out of the four corners on a second anti-earth-oriented surface side, opposite the first anti-earth-oriented surface side.

2. The pointing mechanism according to claim 1, wherein
the thruster side gimbal connects a first thruster group comprising a plurality of thrusters to the deployed boom, and
during orbit raising, when a first operation number which is the number of activated thrusters out of the first thruster group of the first pointing mechanism and a second operation number which is the number of activated thrusters out of a second thruster group connected to the deployed boom of the second pointing mechanism are different from each other, the direction of the deployed boom to which the first thruster group is connected and the direction of the deployed boom to which the second thruster group is connected are adjusted, a satellite center of gravity, the first thruster group and the second thruster group are projected on a plane having a traveling direction as a normal line during orbit raising, and the satellite center of gravity, the first thruster group and the second thruster group are arranged on a same common straight line, so that a ratio of a first distance from the satellite center of gravity to the first thruster group and a second distance from the satellite center of gravity to the second thruster group in the plane is an inverse ratio of the first operation number and the second operation number.

3. The pointing mechanism according to claim 1, wherein when the artificial satellite is accommodated in a rocket fairing, the direction of the deployed boom is configured to be adjusted to be parallel to a surface to which the main body side gimbal is attached.

4. The pointing mechanism according to claim 1, wherein the deployed boom has the longest length in a length tolerance range, and
the length tolerance range is a range satisfied by a length of the deployed boom to accommodate an entire pointing mechanism in a fairing envelope region in a state in which the direction of the deployed boom is configured to be adjusted to be parallel to the surface to which the main body side gimbal is attached.

5. The pointing mechanism according to claim 1, wherein when station keeping is performed, the direction of the deployed boom and the direction of the thruster are adjusted so that a firing direction angle formed by a firing direction of the thruster and a north-south direction of the artificial satellite is the minimum angle in an angle tolerance range, and
the angle tolerance range is a range satisfied by the firing direction angle so that a solar cell paddle does not enter a firing range of the thruster.

6. A pointing mechanism comprising:
a deployed boom having a rod shape;
a main body side gimbal to connect the deployed boom to a satellite main body and adjust a direction of the deployed boom; and
a thruster side gimbal to connect a thruster to the deployed boom and adjust a direction of the thruster, wherein
the pointing mechanism is mounted in a pair on an artificial satellite,
a first attachment portion to which the main body side gimbal is attached and a second attachment portion to which the main body side gimbal of another pointing mechanism of the pair of pointing mechanisms is attached are in rotationally symmetric positions about a satellite center of gravity as seen from an earth-oriented surface side,
the first attachment portion is located at one corner out of four corners on a first anti-earth-oriented surface side, and
the second attachment portion is located at a diagonal corner of the first attachment portion out of the four corners on a second anti-earth-oriented surface side, opposite the first anti-earth-oriented surface side,
the thruster includes a thruster base, and
for each of the pair of pointing mechanisms, a length from the main body side gimbal to the thruster base is substantially equal to a width of the respective anti-earth-oriented surface side.

7. A pointing mechanism comprising:
a deployed boom having a rod shape;
a main body side gimbal to connect the deployed boom to a satellite main body and adjust a direction of the deployed boom; and
a thruster side gimbal to connect a thruster to the deployed boom and adjust a direction of the thruster, wherein
the pointing mechanism is mounted in a pair on an artificial satellite,
a first attachment portion to which the main body side gimbal is attached and a second attachment portion to which the main body side gimbal of another pointing mechanism of the pair of pointing mechanisms is attached are in rotationally symmetric positions about a satellite center of gravity as seen from an earth-oriented surface side,
the first attachment portion is located at one corner out of corners on an anti-earth-oriented surface side, the first attachment portion is located on one of a south surface facing the south when the artificial satellite orbits the earth and a north surface facing the north when the artificial satellite orbits the earth, and
the second attachment portion is located at a diagonal corner of the first attachment portion out of the corners on the anti-earth-oriented surface side in the other surface out of the south surface and the north surface,
the thruster includes a thruster base, and
for each of the pair of pointing mechanisms, a length from the main body side gimbal to the thruster base is substantially equal to a width of the respective anti-earth-oriented surface side.

8. The pointing mechanism according to claim 6, wherein the thruster side gimbal connects a first thruster group comprising a plurality of thrusters to the deployed boom, and
during orbit raising, when a first operation number which is the number of activated thrusters out of the first thruster group and a second operation number which is the number of activated thrusters out of a second thruster group connected to the deployed boom of the other pointing mechanism are different from each other, the direction of the deployed boom to which the first thruster group is connected and the direction of the deployed boom to which the second thruster group is connected are adjusted, the satellite center of gravity, the first thruster group and the second thruster group are projected on a plane having the traveling direction as a normal line during orbit raising, and the satellite center of gravity, the first thruster group and the second thruster group are arranged on the same straight line, so that a ratio of a first distance from the satellite center of gravity to the first thruster group and a second distance from the satellite center of gravity to the second thruster group in the plane is an inverse ratio of the first operation number and the second operation number.

9. The pointing mechanism according to claim 6, wherein when the artificial satellite is accommodated in a rocket fairing, the direction of the deployed boom is configured to be adjusted to be parallel to a surface to which the main body side gimbal is attached.

10. The pointing mechanism according to claim 6, wherein
the deployed boom has the longest length in a length tolerance range, and
the length tolerance range is a range satisfied by a length of the deployed boom to accommodate an entire pointing mechanism in a fairing envelope region in a state in which the direction of the deployed boom is configured to be adjusted to be parallel to the surface to which the main body side gimbal is attached.

11. The pointing mechanism according to claim 6, wherein
when station keeping is performed, the direction of the deployed boom and the direction of the thruster are adjusted so that a firing direction angle formed by a firing direction of the thruster and a north-south direction of the artificial satellite is the minimum angle in an angle tolerance range, and the angle tolerance range is a range satisfied by the firing direction angle so that a solar cell paddle does not enter a firing range of the thruster.

12. The pointing mechanism according to claim 1, wherein the thruster of each of the first and second pointing mechanisms includes a thruster base, and wherein for each pointing mechanism, a length from the main body side gimbal to the thruster base is substantially equal to a width of the respective anti-earth-oriented surface side.

13. The pointing mechanism according to claim 6, wherein each of the main body side gimbal and the thruster side gimbal is a two-axis gimbal.

14. The pointing mechanism according to claim 7, wherein each of the main body side gimbal and the thruster side gimbal is a two-axis gimbal.

* * * * *